United States Patent
Avishai et al.

(10) Patent No.: US 7,370,127 B2
(45) Date of Patent: May 6, 2008

(54) HIGH-SPEED INTERNAL BUS ARCHITECTURE FOR AN INTEGRATED CIRCUIT

(75) Inventors: David Avishai, Nes Ziona (IL); Eliezer Weitz, Holon (IL); Yehiel Engel, Moshav Zefora (IL); Raanan Gewirtzman, Haifa (IL)

(73) Assignee: Broadlight Ltd, Ramat Gan (IL)

( * ) Notice: Subject to any disclaimer, the term of this patent is extended or adjusted under 35 U.S.C. 154(b) by 181 days.

(21) Appl. No.: 11/149,553

(22) Filed: Jun. 10, 2005

(65) Prior Publication Data
US 2006/0282605 A1 Dec. 14, 2006

(51) Int. Cl.
G06F 3/00 (2006.01)
(52) U.S. Cl. .......................... 710/52; 710/310
(58) Field of Classification Search ........ 710/316–317, 710/309–310, 52–53; 709/213–216
See application file for complete search history.

(56) References Cited

U.S. PATENT DOCUMENTS

| | | | |
|---|---|---|---|
| 5,001,625 A | 3/1991 | Thomas et al. | |
| 5,796,964 A | 8/1998 | Bass et al. | |
| 6,314,484 B1 | 11/2001 | Zulian et al. | |
| 6,442,642 B1 | 8/2002 | Brooks | |
| 6,467,012 B1 * | 10/2002 | Alvarez et al. | 710/316 |
| 6,633,944 B1 | 10/2003 | Holm et al. | |
| 6,810,460 B1 | 10/2004 | Kirkwood | |
| 6,813,689 B2 * | 11/2004 | Baxter, III | 711/114 |
| 6,857,037 B2 | 2/2005 | Messmer et al. | |
| 6,931,472 B1 * | 8/2005 | Kondo et al. | 710/310 |
| 7,143,221 B2 * | 11/2006 | Bruce et al. | 710/113 |

* cited by examiner

*Primary Examiner*—Clifford Knoll
(74) *Attorney, Agent, or Firm*—The Nath Law Group; Jerald L. Meyer; Jonathan A. Kidney (57) ABSTRACT

An internal bus architecture capable of providing high speed inter-connection and inter-communication between modules connected in an integrated circuit such as an application specific integrated circuit (ASIC). The internal bus architecture includes multiple interface units for interfacing with the modules of the ASIC and at least one basic modular unit coupled to the interface units for allowing simultaneous data transfers between the interface units. Each of the basic modular units has an upload unit for transferring upstream data, and a download unit for transferring downstream data.

30 Claims, 7 Drawing Sheets

HIGH-SPEED INTERNAL BUS ARCHITECTURE FOR AN INTEGRATED CIRCUIT

REFERENCES CITED

Reference will be made in the following description to the following US patents whose contents are incorporated herein by reference:

| | | |
|---|---|---|
| 5,001,625 | March 1991 | Thomas, et al. |
| 5,796,964 | August 1998 | Bass, et al. |
| 6,314,484 | November 2001 | Zulian, et al. |
| 6,442,642 | August 2002 | Brooks |
| 6,633,944 | October 2003 | Holm, et al. |
| 6,810,460 | October 2004 | Kirkwood |
| 6,857,037 | February 2005 | Messmer, et al. |

FIELD OF THE INVENTION

The present invention relates generally to internal buses in integrated circuits in general and to application specific integrated circuits (ASICs) in particular, and more particularly to a high-speed internal bus architecture that supports both inter-connection and inter-communication between various modules connected in an integrated circuit or ASIC.

BACKGROUND OF THE INVENTION

In most computer systems, communications between different components is typically provided by a bus. The bus architecture is designed to be well established and portable such that it can be utilized in multiple configurations without excessive additional development expenses when designing for derivative products. In addition a bus is designed to perform high-speed communication processing to support an increase in frequency of a processor's clock.

Figure 1:
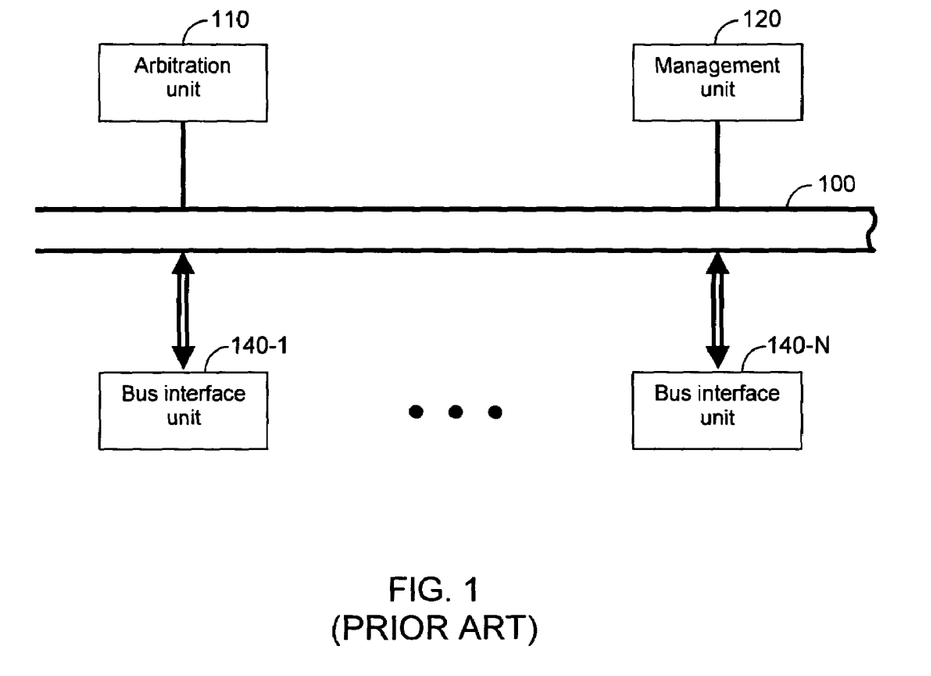
FIG. 1—is a diagram of a typical prior art bus architecture.

FIG. 1 shows an exemplary block diagram of a typical bus architecture of a bus 100 operative within a computer system. The typical bus architecture of a computer system carries data and control flows. The bus 100 is a physical implementation of shared connections between all components within a computer system for the purpose of inter-communication. The communication is defined by, in most cases, a strict bus protocol. The bus protocol regulates the inter-communication between all components attached to bus 100. The bus 100 typically consists of an arbitration unit 110, used to determine which one of the attached components to the bus 100 should control the operations on the bus at a selected time. Arbitration unit 110 assigns the ownership of bus 100 for any given operation. The bus 100 also includes a management unit 120 for providing higher-level functions associated with system operations such as queue management and bus monitoring for error detections. Functional components are attached to bus 100 through respective interface units 140-1 to 140-N. To the extent that reference is made to the interface units without regard to a specific one thereof, such interface device(s) will be referenced as 140. Thus, each interface unit 140 is capable of generating control signals and transferring data across bus 100. The interface units 140 may interface with components, such as processors, controllers (e.g., disk controllers), and so on. Examples of buses employing such a bus architecture are a peripheral component interconnect (PCI) bus, a small computer systems interface (SCSI) bus, and the like. Other examples of similar bus architectures may be found in U.S. Pat. Nos. 5,001,625, 5,796,964, and 6,314,484, each of which is incorporated herein by reference for their useful background descriptions of the state of the art heretofore.

Another type of bus architecture disclosed in the related art is mainly utilized in application specific integrated circuits (ASICs). This type of bus architecture is also referred to as an "internal bus". Typically, an ASIC includes one or more core processors, one or more memory units, and other functional modules, all integrated on a single semiconductor chip. Having the modules on the same chip allows data to be easily and quickly transferred between the various modules. To provide high speed data transfers on a chip, specialized buses are designed specifically for this purpose. One example for such specialized bus is the advanced high-performance bus (AHB), developed by ARM™ Ltd. The AHB operates in accordance with the advanced microcontroller bus architecture (AMBA) protocol and provides high-speed data transfers between various components on a chip. Another example is the advanced peripheral bus (APB), which provides the basic peripheral macro-cell communication infrastructure as a secondary bus from the higher bandwidth pipelined main system bus. The APB is designed to reduce interface complexity for the support of peripheral functions. A detailed description of the AHB and APB architectures may be found in U.S. Pat. Nos. 6,442,642, 6,810,460, 6,633,944, and 6,857,037, each of which is incorporated herein by reference for its useful background description of the state of the art heretofore. A limitation of the AHB, APB in addition to other types of internal buses is their inability to support inter-connection and inter-communication between the various modules on an ASIC.

Therefore, in the view of the limitations of in the prior art, it would be advantageous to provide a high-speed internal bus architecture that supports both inter-connection and inter-communication among various modules connected in an integrated circuit (IC).

SUMMARY OF THE INVENTION

This object is realized in accordance with a first aspect of the invention by an internal bus architecture capable of providing high speed inter-connection and inter-communication between modules connected in an integrated circuit (IC), said internal bus architecture comprising:

a plurality of interface units for interfacing with the modules of said IC;

at least one basic modular unit coupled to said plurality of interface units for allowing simultaneous data transfers between said plurality of interface units, wherein each of said basic modular units comprises at least:

an upload unit for transferring upstream data; and a download unit for transferring downstream data.

In accordance with a second aspect of the invention, there is provided a method for high-speed inter-connecting and inter-communicating between modules connected in an integrated circuit (IC), the method comprising:

providing an internal bus architecture that includes a plurality of interface units and at least one basic modular unit;

connecting the modules of said IC to said plurality of interface units; and connecting said plurality of interface units to said basic modular unit;

thereby allowing data to be transferred simultaneously between the modules of said IC connected to said plurality of interface units by means of said at least one basic modular unit.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF EXEMPLARY EMBODIMENTS

Disclosed is an internal bus architecture designed to address the requirements of high speed inter-connection and inter-communication between various modules connected in an integrated circuit (IC) and will be described by way of non-limiting example only with regard to an implementation in application specific integrated circuits (ASICs). The bus architecture comprises a basic modular unit that allows the simultaneous data transfers between the ASIC's modules. The basic modular unit can be easily extended to allow the connection of additional modules, including modules having different functionality, onto the bus.

In the following description, reference will be made to devices of which more than one are referenced in the drawings by a generic numeric descriptor N followed by a numeric suffix of the form N-1, N-2 . . . N-m. To the extent that reference is made to the devices without regard to a specific one thereof, such device(s) will be referenced by the generic numeric descriptor N only.

Figure 2:
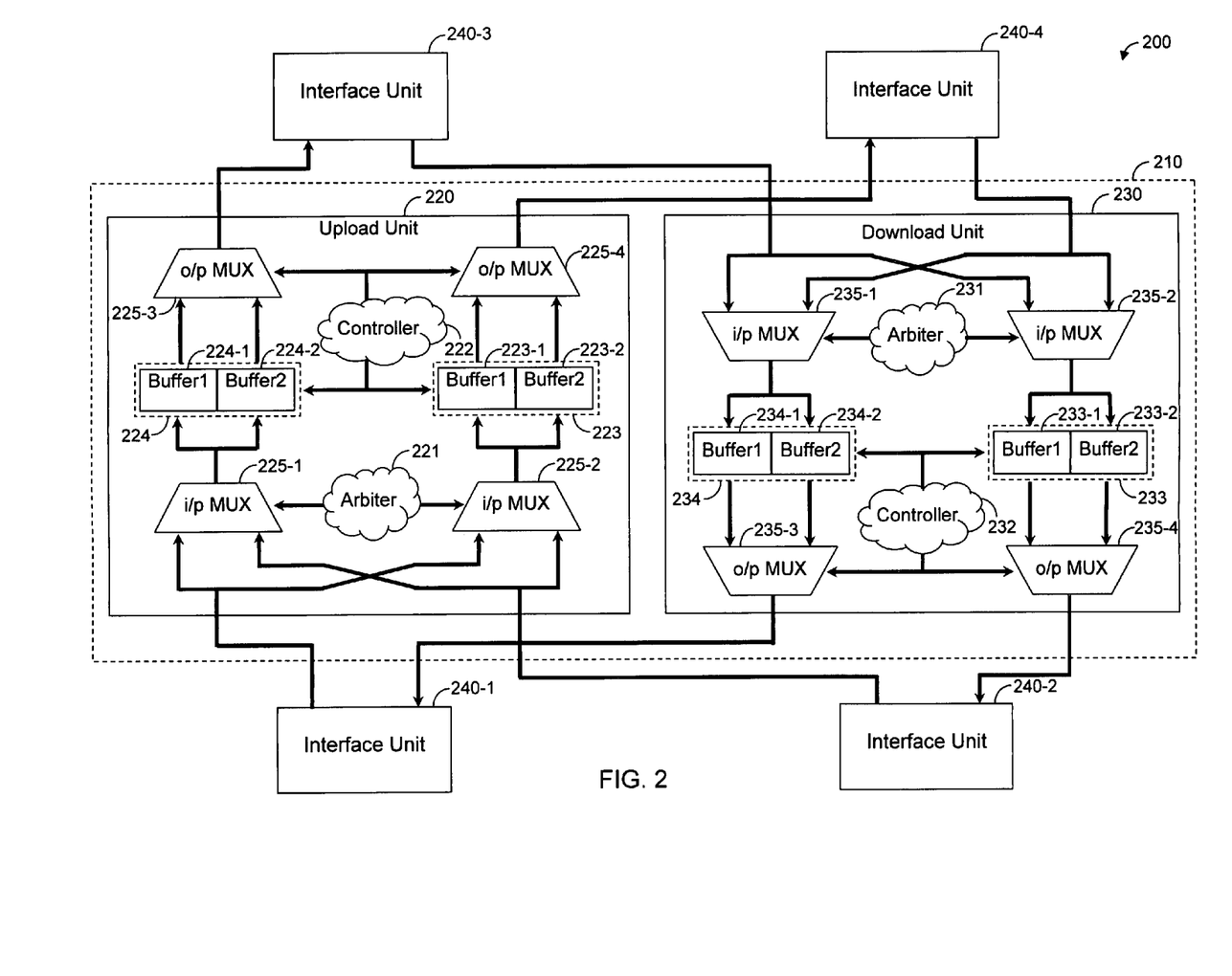
FIG. 2—is a diagram of an exemplary bus architecture constructed and operative in accordance with an embodiment of the present invention.

Referring to FIG. 2, a non-limiting and exemplary diagram of a bus architecture 200 constructed and operative in accordance with an embodiment of the present invention is shown. The bus architecture 200 includes a basic modular unit 210 comprising an upload unit 220 for transferring upstream data and a download unit 230 for transferring down-stream data. The basic modular unit 210 is coupled to four interface units 240-1 through 240-4 for interfacing with various ASIC's modules (not shown). Each module, connected through an interface unit 240, may serve the function of either a source or destination module. Generally, a source module initiates a transaction and a destination module acknowledges the transaction. The destination and source modules may be, but are not limited to, peripheral units, other basic modular units, configurable interfaces, processors, and the like.

The upload unit 220 includes an arbiter 221 connected to input multiplexers (MUXes) 225-1 and 225-2, as well as a controller 222 coupled to a first pair of buffers 223-1, 223-2 and a second pair of buffers 224-1, 224-2. The controller 222 is further connected to the output MUXes 225-3 and 225-4. In the upload unit 220, data flows from interface units 240-1 and 240-2 to interface units 240-3 and 240-4. In the upload flow, each of the interface units 240-1 and 240-2 serves as a source, while each of the interface units 240-3 and 240-4 serves as a destination. The arbiter 221 controls the input MUXes 225-1 and 225-2 to enable only a single source to transfer data toward one of the destinations. The buffers 223 and 224 are used to temporarily store data transferred from a source unit to a destination unit. Each cycle, a data item is written into one of the buffers in the first or second pair of buffers under the control of controller 221. The buffers 223 and 224 may be any type of memory elements.

The download unit 230 includes an arbiter 231 connected to input MUXes 235-1 and 235-2, a controller 232 coupled to a first pair of buffers 233-1, 233-2 and a second pair of buffers 234-1, 234-2. The controller 232 is further connected to output MUXes 235-3 and 235-4. In the download unit 230, data flows from interface units (i.e., sources) 240-3 and 240-4 to interface units (i.e., destinations) 240-1 and 240-2. The arbiter 231 controls the output MUXes 235-1 and 235-2 to enable only a single source to transfer data toward one of the destinations. Here, as in the upload unit 220, the buffers 233 and 234 are used to temporarily store data transferred from a source to destination interface unit. The controller 232 controls the reads and writes to each internal buffer of buffers 233 and 234.

Generally, each transaction performed by the basic modular unit 210, either in the download or upload direction includes two phases: 1) an arbitration phase; and 2) a data transfer phase. In the arbitration phase, an address of a destination unit set by one of the source interface units is processed, and then the arbiter selects one of the input MUXes for enabling data transfer to the destination unit designated in the address. For example, if the interface unit 240-2 request to transfer data to the interface unit 240-4, the arbiter 221 enables the input MUX 225-2 to select the input connected to the interface unit 240-2. The arbitration between source interface units is made at each clock cycle only if the two source interface units request to transfer data at the same time to the same destination interface unit; otherwise, arbitration is not needed. The arbiters 221 and 231 are configured to operate in an arbitration mode including, but not limited to, a prioritized, a round robin, a weighted round robin, and so on. Each of the arbiters 221 or 231 may employ a different arbitration mode. The inventors have noted that in some embodiments, each of the arbiters 221 or 222 may comprise two separate logic units, each controlling a different input MUX.

In the data phase, data transferred to a destination interface unit, is first sampled into one of the internal buffers (e.g., buffers 224-1 or 224-2), and then the buffer is marked as full. Simultaneously, the data is read from the "sampling buffer" and written to the destination interface unit. In addition, the sampling buffer is marked as empty. The controller 222 controls this process by selecting, at each clock cycle, a different internal buffer and enabling the respective input of the output MUX. For example, if in the current clock cycle data is sampled into the buffer 224-1, the input of the output MUX 225-3, connected to buffer 224-1, is enabled. In the subsequent clock cycle a data item is sampled into the buffer 224-2 and the input of the output MUX 225-3, connected to buffer 224-2, is enabled.

The latency for transferring a data item from a source interface unit to a destination interface unit is at least one clock cycle. The latency is greater than one clock cycle if a module connected to a destination interface unit is busy and cannot receive incoming data items. In such case, input data items are temporarily stored in the internal buffers and both internal buffers are marked as full. The operation of components of the basic modular unit 210 is controlled by means of a proprietary protocol (hereinafter the "transaction protocol") described in greater detail below.

Figure 3:
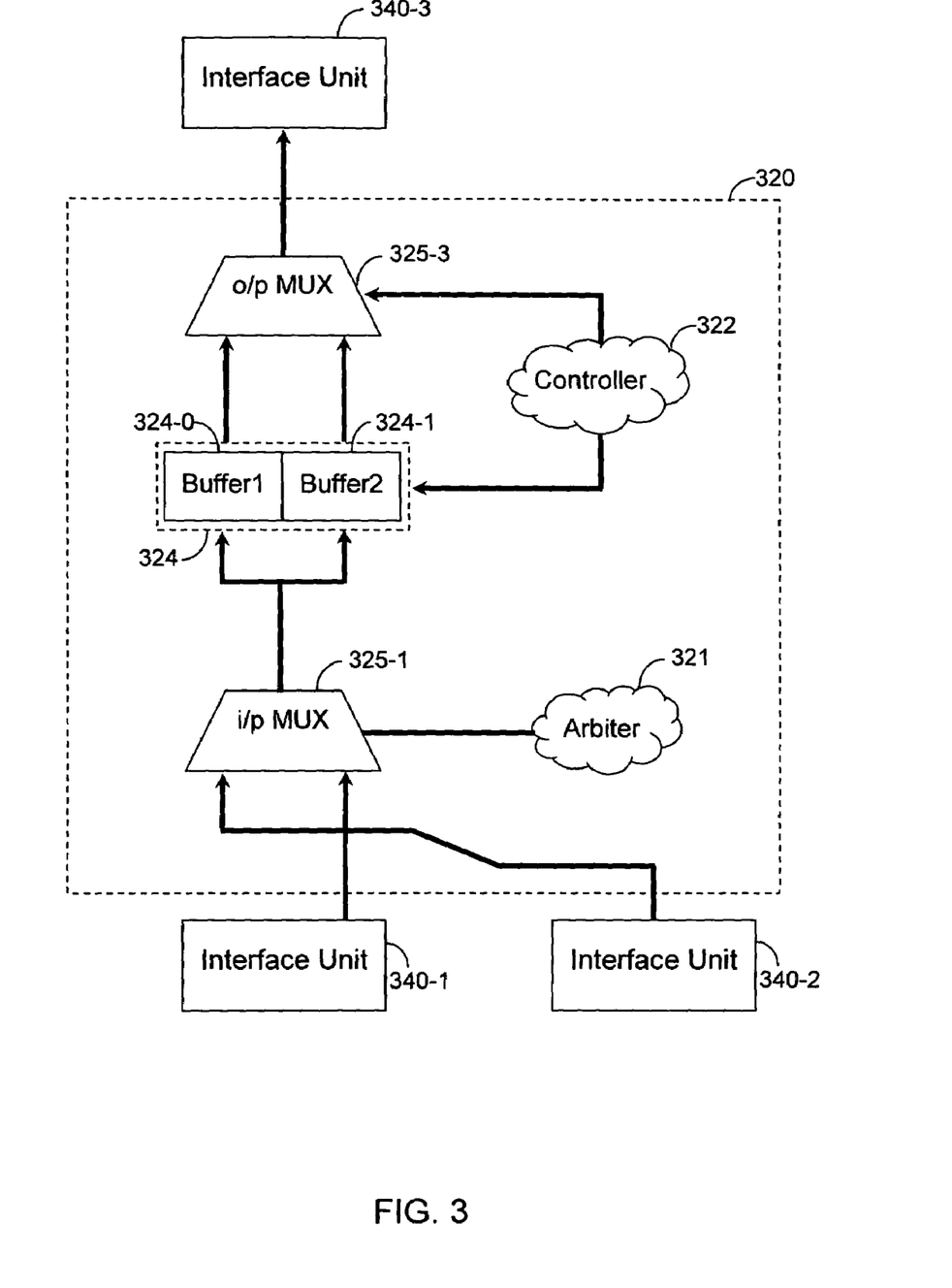
FIG. 3—is a diagram of an exemplary upload unit connected to two source interface units and a single destination interface unit.

The upload unit 220 and the download unit 230 may be constructed to serve a different number of source and destination interface units 240. In fact, the number of the source interface units 240 connected to the basic modular unit 210 may be $2^n$, where n is equal to or greater than one. The number of the destination interface units 240 connected to the basic modular unit 210 may be $2^m$, where m is equal to or greater than zero. For example, FIG. 3 shows an exemplary and non-limiting diagram of an upload unit 320 connected to two source interface units 340-0 and 340-1 and a single destination interface unit 340-3. As can be noted, upload unit 320 includes, a single pair of buffers 324-1, 324-2, an input MUX 325-1 enabled by arbiter 321, and an output MUX 325-3 controlled by controller 322.

In one embodiment of the present invention, bus architecture 200 allows to connect one or more basic modular units 210 to each other, thus forming a new bus topology. Bus topologies that may be constructed in accordance with this embodiment include, but are not limited to, a tree, a matrix, a ring, or any combination thereof. For example, a mixed topology may be a combination of both tree and matrix topologies.

Figure 4:
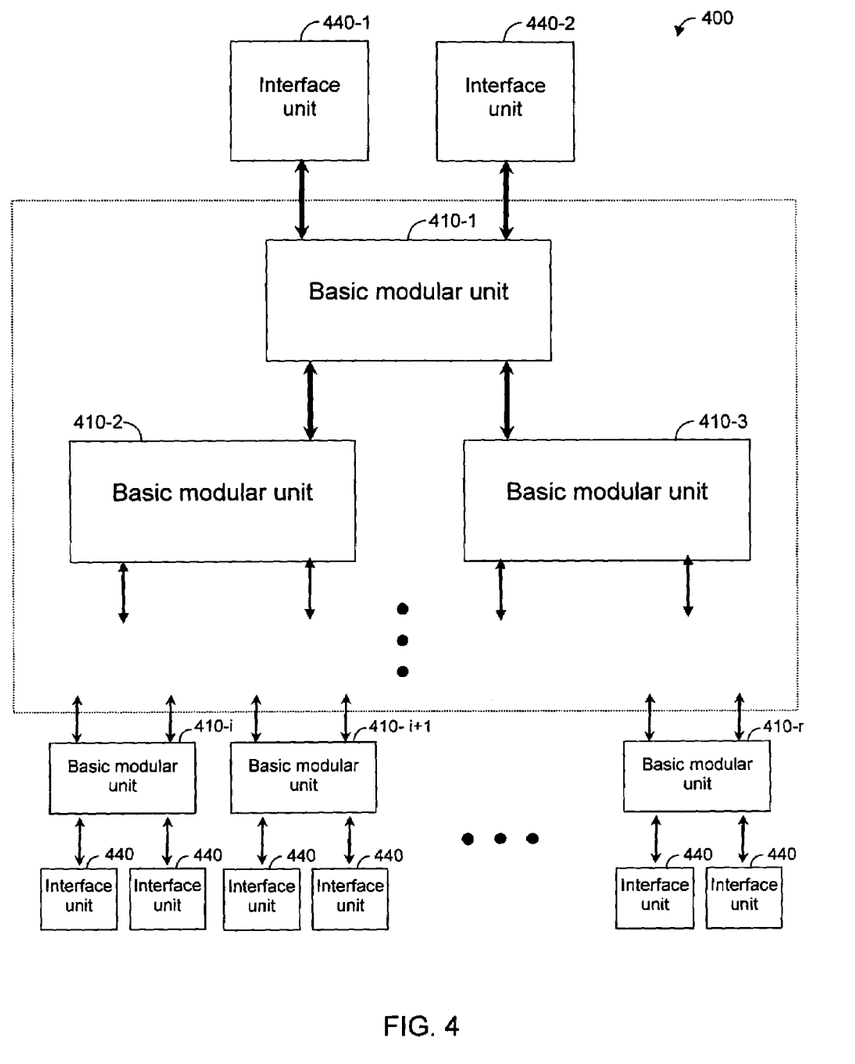
FIG. 4—is a diagram of an exemplary tree topology bus constructed in accordance with an embodiment of the present invention.

FIG. 4 shows an exemplary and non-limiting diagram of a tree topology bus 400 constructed in accordance with an embodiment of the present invention. The leaves of the tree bus 400 are interface units 440 and the nodes are basic modular units 410. The tree bus 400 includes 'r' basic modular units 410-1 through 410-r, each of which includes upload and download units (not shown) described in greater detail above. The tree bus 400 is a binary tree in which each node includes at most two children, i.e., basic modular units. In the tree bus topology the basic modular units 410 are utilized for the inter-connection of the various modules of an ASIC. It should be noted that the tree topology may be other than a full binary tree.

Figure 5:
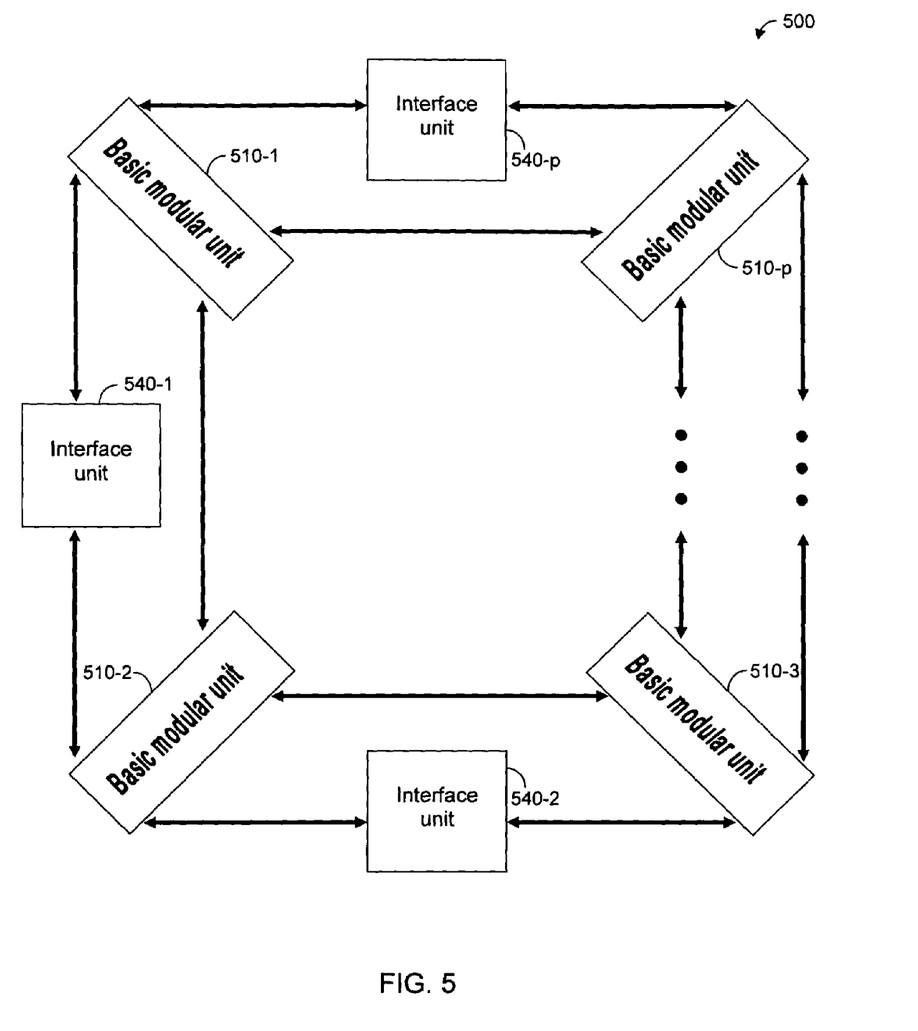
FIG. 5—is a diagram of an exemplary ring topology bus constructed in accordance with an embodiment of the present invention.
Figure 6:
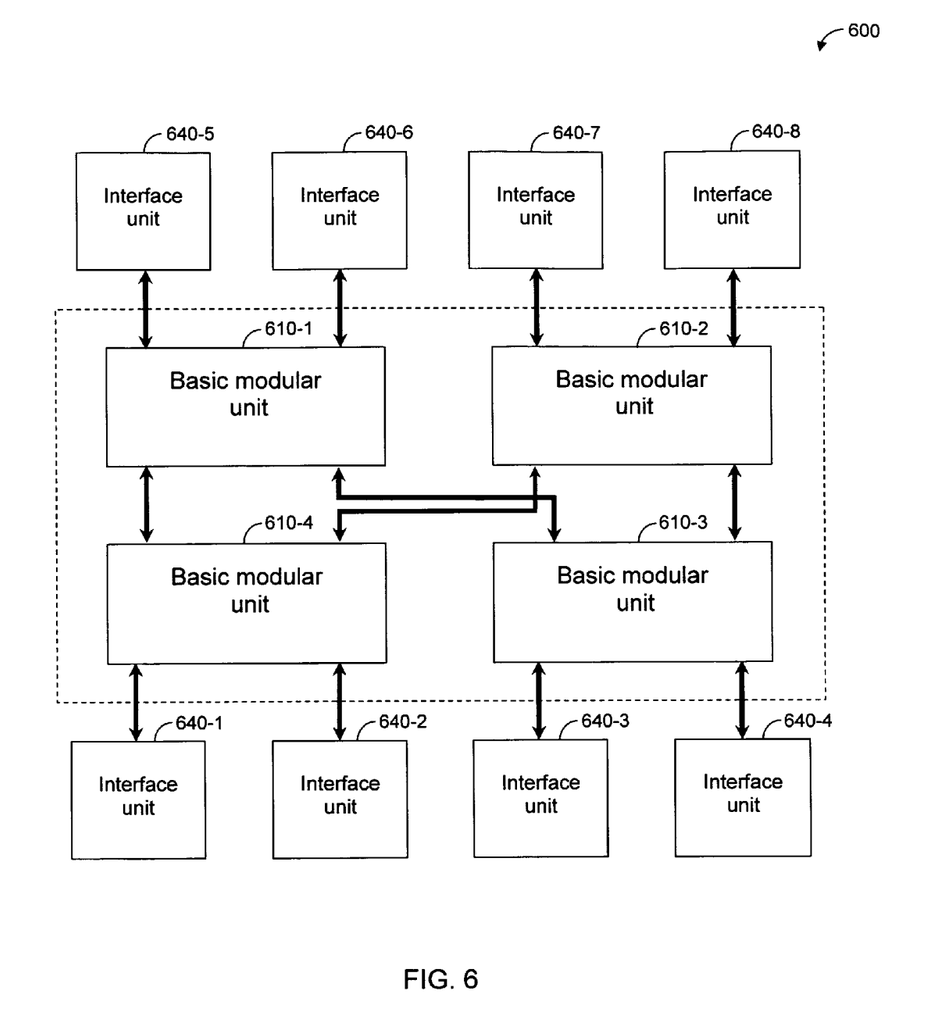
FIG. 6—is a diagram of an exemplary matrix topology bus constructed in accordance with an embodiment of the present invention.

FIG. 5 shows an exemplary and non-limiting diagram of a ring topology bus 500 constructed in accordance with an embodiment of the present invention. The ring bus 500 includes 'p' basic modular units 510-1 through 510-p and 'p' interface units 540-1 through 540-p. Each basic modular unit 510-m communicates with two adjacent modular units 510-(m−1), 510-(m+1) and with two adjacent interface units 540-(m−1), 540-(m+1). This topology allows all modules of an ASIC to communicate with each other. FIG. 6 shows an exemplary and non-limiting diagram of a matrix topology bus 600 constructed in accordance with an embodiment of the present invention. The matrix bus 600 includes four basic modular units 610-1 through 610-4 interfacing with eight interface units 640-1 through 640-8 in the configuration depicted in FIG. 6. Each of the basic modular units 610 includes an upload and download unit as shown above. This topology allows connecting more than two destination modules to the upload unit and more than two source modules to the destination unit.

Figure 7:
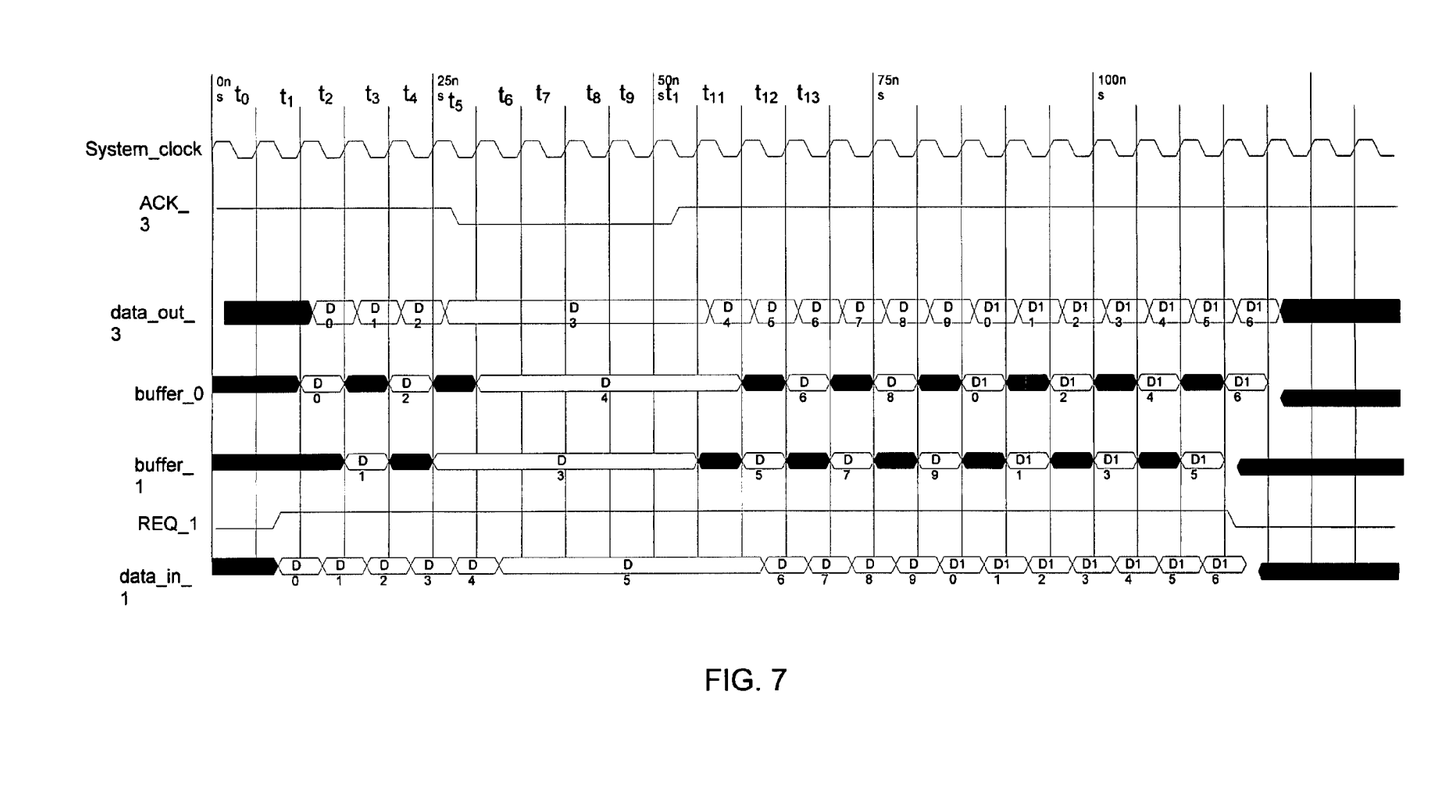
FIG. 7—is a time diagram illustrating the operation of the transaction protocol disclosed in accordance with the present invention.

Referring now to FIG. 7, an exemplary and non-limiting time diagram 700 illustrating the operation of the transaction protocol according to the present invention is shown. The transaction protocol governs the execution of transactions in the disclosed bus architecture. The elements of the bus architecture discussed hereinbelow are previously shown in FIG. 3.

There are two main control signals that are involved in each transaction: 1) a source request ("REQ"); and, 2) a destination acknowledge ("ACK"). A REQ signal is asserted by each source interface unit when a data item is ready to be sent (in the data phase of the transaction). An ACK signal is asserted by each destination interface unit once the unit is ready to receive a data item. For example, the REQ signal is generated by either the interface unit 340-1 or 340-2, while the ACK signal is generated by the interface unit 340-3. In a bus architecture that includes more than a single destination interface unit, each destination unit generates its own ACK signal. The transaction protocol assures that as the ACK signal of a selected destination is active, for a specific cycle, a data item ($D_i$) is accepted in the destination interface unit and a new data item ($D_{i+1}$) can be introduced on the bus. A REQ signal is generated regardless of the state of the ACK signal.

FIG. 7 shows the signals "system_clock", "ACK_3", "REQ_1", "buffer_0", "buffer_1", "data_out_3", and "data_in_1". The signal ACK_3 is the ACK signal produced by the interface unit 340-3, the signal REQ_1 is a request produced by the interface unit 340-1, the data_in_1 represents data at the output of the interface unit 340-1, and the data_out_3 represents data at the input of the interface unit 340-3. The buffer_0 and buffer_1 respectively show the content of the internal buffers 324-0 and 324-1. The times shown in the diagram and referred to in the following discussion are in reference to the clock cycles of the system_clock. In the following description, logic HIGH is active, but it will be understood that reverse logic could be employed where logic LOW is active.

At time $t_0$, signal ACK_3 is HIGH (i.e., active) and afterward, at time $t_1$, the signal REQ_1 is also HIGH, i.e. it is set to HIGH between times $t_0$ and $t_1$. Once, the signal REQ_1 is set to HIGH, data items can be uploaded to the destination interface unit 340-3. To this end, data items data$_{in}$_1 are first placed on the output of the source interface unit 340-1. At time $t_2$, a data item $D_0$ is sampled to buffer 324-0 and written to data_out_3. In the next clock cycle, a data item $D_1$ is sampled to buffer 324-1 and also written to data$_{out}$_3. Each clock cycle an input data item is sampled to the current empty buffer under the control of controller 321. At time $t_5$ the ACK_3 signal is LOW (i.e., inactive), i.e. it is set to LOW between times $t_4$ and $t_5$, and thus input data items cannot be uploaded to the destination interface unit 340-3. As a result, at time $t_6$, a data item $D_4$ is written to an empty buffer 324-0, and thereafter no data items can be saved in either one of the internal buffers 324-0 or 324-1. This state is preserved until the ACK_3 signal is asserted, i.e., the destination interface unit 340-1 is ready to receive data again. At time $t_{10}$, the signal ACK_3 is again HIGH, i.e. it is set to HIGH between times $t_9$ and $t_{10}$, and consequently the input data$_{out}$_3 and buffer 324-1 are both freed. Starting from time $t_{12}$, data items waiting on input data$_{in}$_1 are transferred to the destination interface unit 340-3 (i.e., written to data$_{out}$_3) in latency of only one cycle.

For simplicity, the example provided herein describes only a single source unit transferring data items to a single destination unit. However, if two source interface units request to send data to the same destination unit, then both source units generate REQ signals. The decision as to which of the source units is enabled to send data is done by an arbiter, for example arbiter 321, according to a pre-configured arbitration mode and the buffers' status. It should be noted that if the REQ signal is inactive, data items are not loaded to the output of the source interface unit (e.g., to data_in_1). If the ACK signal is inactive a request waits to be served. The ACK signal may be asserted or de-asserted according to the internal buffers' status and the state of the REQ signal. Specifically, the ACK logic operates as follows: if one of the two internal buffers is empty, an ACK is sent only to a first source interface unit. If the REQ signal of the first source is inactive, but the REQ signal of a second source is active, the arbiter then de-asserts the ACK signals for the first source unit and asserts it to the second source unit.

The transaction protocol is based on the independency of the upload and download units included in the basic bus modular unit. As shown, each of the upload and download units (e.g., the upload unit 220 and the download unit 230) may include two sub-units. These sub-units are two identical halves, each having an input MUX, a pair of buffers and an output MUX. Each such sub-unit independently obeys the protocol requirements and restrictions, and thus allows for two simultaneous transactions in each upload unit or download unit. The independency of the upload and download units allows the disclosed bus to operate at high clock rates.

Furthermore, owing to improved technology in new IC designs, the routes between IC's components (e.g., cells) is a limiting factor for achieving a bus operating at high clock rates. The disclosed bus architecture significantly reduces and may even eliminate this limitation as it serves as an impedance separator between distant units in the same IC, and thus the bus can be operated at high clock rates. Timing arcs are merely between two basic modular units, or between a basic modular unit and an IC module. In the latter case the basic modular unit and the IC module are placed close to each other.

The invention claimed is:

1. An internal bus architecture for modules in an integrated circuit (IC), said internal bus architecture comprising:
    at least two source interface units and at least two destination interface units for interfacing with the modules of said IC; and
    at least one basic modular unit coupled to said source interface units and to said destination interface units, the at least one basic modular unit comprising an upload unit for transferring upstream data; and a download unit for transferring downstream data;
    the upload unit and the download unit in each of said basic modular units being mutually independent and being adapted under control of a transaction protocol to simultaneously transfer upstream data and downstream data;
    the upload unit comprising a buffer having a pair of internal-buffers for temporary storage of data to be transferred from the source interface unit to the destination interface unit, wherein data from either internal buffer can be transferred in a single clock cycle.

2. The internal bus architecture of claim 1, wherein said upload unit comprises:
    an input multiplexer (MUX) connected to the source interface units;
    an arbiter for selecting a single input of said input MUX to enable only a single source interface unit to transfer data to the destination interface unit;
    an output MUX coupled to said buffer and said destination interface unit; and
    a controller for controlling reading and writing of data to and from said buffer.

3. The internal bus architecture of claim 2, wherein arbitration between the source interface units is performed if the source interface units request to transfer data to the destination interface unit in the same clock cycle.

4. The internal bus architecture of claim 3, wherein said arbitration is performed according to a predefined arbitration mode of said arbiter.

5. The internal bus architecture of claim 4, wherein said arbitration mode includes any one of: a prioritized mode, a round robin mode, a weighted round robin mode.

6. The internal bus architecture of claim 2, wherein said controller alternately writes data to respective ones of said internal-buffers during each successive clock cycle.

7. The internal bus architecture of claim 6, wherein said controller alternately reads data from respective ones of said internal-buffers by enabling a single input of said output MUX.

8. The internal bus architecture of claim 7, wherein alternation is performed in each clock cycle.

9. The internal bus architecture of claim 1, wherein said download unit comprises at least:
    an input multiplexer (MUX) connected to the source interface units;
    an arbiter for selecting a single input of said input MUX to enable only a single source interface unit to transfer data to the destination interface unit;
    an output MUX coupled to said buffer and said destination interface unit; and
    a controller for controlling reading and writing of data to and from said buffer; and
    wherein the buffer in the download unit has a pair of internal-buffers for temporary storage of data to be transferred from the source interface units to the destination interface unit, wherein data from either internal buffer can be transferred in a single clock cycle.

10. The internal bus architecture of claim 9, wherein the arbitration between the source interface units is performed if said source interface units request to transfer data to the destination interface unit at the same time.

11. The internal bus architecture of claim 10, wherein said arbitration is performed according to a predefined arbitration mode of said arbiter.

12. The internal bus architecture of claim 11, wherein said arbitration mode includes any one of: a prioritized mode, a round robin mode, a weighted round robin mode.

13. The internal bus architecture of claim 9, wherein said controller alternately writes data to respective ones of said internal-buffers.

14. The internal bus architecture of claim 13, wherein said controller alternately reads data from respective ones of said internal-buffers by enabling a single input of said output MUX.

15. The internal bus architecture of claim 14, wherein alternation is performed in each clock cycle.

16. The internal bus architecture of claim 1, wherein each of the modules of said IC comprises at least one in the group of: a peripheral unit, a basic modular unit, a configurable interfaces, a processor.

17. The internal bus architecture of claim 1, having at least two basic modular units connected to each other to form a bus topology.

18. The internal bus architecture of claim 17, wherein said bus topology includes at least one of: a tree topology, a matrix topology, a ring topology, or any combination thereof.

19. The internal bus architecture of claim 1, wherein the integrated circuit is an application specific integrated circuit (ASIC).

20. A method for high-speed inter-communicating between modules connected in an integrated circuit (IC) via an internal bus architecture comprising:
   at least two source interface units and at least two destination interface units for interfacing with the modules of said IC; and
   at least one basic modular unit coupled to said source interface units and to said destination interface units and comprising an upload unit for transferring upstream data; and a download unit for transferring downstream data;
   the method comprising:
   temporarily storing said upstream data in a buffer of a pair of internal buffers of the upload unit;
   temporarily storing said downstream data in a buffer of a pair of internal buffers of the download unit;
   simultaneously sampling the upstream data and the downstream data from the respective buffers; and
   simultaneously transferring the upstream data to a first one of the destination units and the downstream data to a second one of the destination units, wherein data from either buffer of the internal buffers can be transferred in a single clock cycle.

21. The method of claim 20, further including:
   arbitrating between the source interface units for transferring data to the destination interface unit from only a single one of the source interface units;
   temporarily storing data to be transferred from the source interface units to the destination interface unit in one of the pair of internal-buffers of one of said upload unit buffer or said download unit buffer; and
   controlling reads and writes of said data to and from said internal-buffers.

22. The method of claim 21, wherein arbitrating between the source interface units is performed if said source interface units request to transfer a data item to the destination interface unit in the same clock cycle.

23. The method of claim 21, wherein controlling writes of said data further comprises:
   alternately writing data, in each clock cycle, between respective ones of said internal-buffers.

24. The method of claim 21, wherein controlling reads of said data further comprises enabling, in each clock cycle, a different one of said internal buffers.

25. The method of claim 20, including controlling said basic modular unit by means of a transaction protocol that allows the data to be transferred simultaneously using a request (REQ) signal and acknowledge (ACK) signal.

26. The method of claim 25, wherein said REQ signal is asserted by the source interface unit once said source interface unit is ready to transfer data.

27. The method of claim 25, wherein said ACK signal is asserted by the destination interface unit once said destination interface unit is ready to receive data.

28. The method of claim 20, further comprising connecting at least two of said basic modular units to each other to form a bus topology.

29. The method of claim 28, wherein said bus topology includes at least one of: a tree topology, a matrix topology, a ring topology, or any combination thereof.

30. The method of claim 20, wherein the integrated circuit is an application specific integrated circuit (ASIC).

* * * * *